US006859672B2

(12) United States Patent
Roberts et al.

(10) Patent No.: US 6,859,672 B2
(45) Date of Patent: Feb. 22, 2005

(54) METHOD OF LINKING A FOOD SOURCE WITH A FOOD PRODUCT

(75) Inventors: William P. Roberts, Spartanburg, SC (US); Michael Esakov, Inman, SC (US)

(73) Assignee: Cryovac, Inc., Duncan, SC (US)

( * ) Notice: Subject to any disclaimer, the term of this patent is extended or adjusted under 35 U.S.C. 154(b) by 390 days.

(21) Appl. No.: 09/971,336

(22) Filed: Oct. 4, 2001

(65) Prior Publication Data

US 2003/0069772 A1 Apr. 10, 2003

(51) Int. Cl.$^7$ ............................................... G05B 19/42
(52) U.S. Cl. ........................... 700/89; 706/21; 452/150; 452/155; 452/157; 452/158
(58) Field of Search ............................ 700/89; 452/150, 452/155, 157, 158; 706/21

(56) References Cited

U.S. PATENT DOCUMENTS

| | | | |
|---|---|---|---|
| 4,563,739 A | | 1/1986 | Gerpheide et al. |
| 5,256,863 A | | 10/1993 | Ferguson et al. |
| 5,257,741 A | | 11/1993 | Rode et al. |
| 5,311,424 A | | 5/1994 | Mukherjee et al. |
| 5,478,990 A | * | 12/1995 | Montanari et al. .......... 235/375 |
| 5,602,377 A | | 2/1997 | Beller et al. |
| 5,673,647 A | * | 10/1997 | Pratt ....................... 119/51.02 |
| 5,745,036 A | | 4/1998 | Clare |
| 5,768,384 A | | 6/1998 | Berson |
| 5,770,841 A | | 6/1998 | Moed et al. |
| 5,869,819 A | | 2/1999 | Knowles et al. |
| 5,878,137 A | | 3/1999 | Ippolito et al. |
| 5,964,656 A | * | 10/1999 | Lawler, Jr. et al. ......... 452/173 |

(List continued on next page.)

FOREIGN PATENT DOCUMENTS

| WO | 98/14370 | 4/1998 |
|---|---|---|
| WO | 99/45761 | 9/1999 |

OTHER PUBLICATIONS

Levenspiel, Octave "Chemical Reaction Engineering" pp. 253–257, second edition 1972, John Wiley & Sons.*
Escort Memory Systems, Case Study, Meat Packing Integrator (http://www.ems–rfid.com/apps/meatpackcase.html)
AgInfoLink Global Inc., Technical Info RFID, Barcodes, Genetic Tracking (http://www.aginfolink.com/webpages/technical_frames.html).
EAN International, Traceability of Beef, Application of EAN/UCC Standards in Implementing Council Regulation (EC) No. 820/97 (Feb. 1999).
Octave Levenspiel, Chemical Reaction Engineering, pp. 253–257 (1972, $2^{nd}$ Edition, John Wiley & Sons).
UCC/EAN Speeds Convergence of Tracking and Authentication, Authentication News, vol. 6 No. 6, pp. 1 & 3 (Sep. 2000).

*Primary Examiner*—Anthony Knight
*Assistant Examiner*—Thomas Pham
(74) *Attorney, Agent, or Firm*—Daniel B. Ruble

(57) ABSTRACT

A method of linking source units of food with product items that include at least a portion of one or more of the source units of food, where a conversion process produces a plurality of product items from a plurality of source units (e.g., at a meat processing plant). A conversion algorithm is created to estimate within a desired confidence level a range of the amount of time required by the conversion process to produce a product item from one or more of the source units of food. A range of an amount of conversion time required to produce a selected product item is estimated by applying the conversion algorithm. The estimated range amount of conversion time for the selected product item is subtracted from the time of exit from the conversion process for the selected product item to generate an estimated time range of entry. Each source unit having a time of entry into the conversion process within the estimated time range of entry is identified.

46 Claims, 3 Drawing Sheets

U.S. PATENT DOCUMENTS

| | | | |
|---|---|---|---|
| 5,978,774 A | | 11/1999 | Rogers et al. |
| 6,018,719 A | | 1/2000 | Rogers et al. |
| 6,104,827 A | * | 8/2000 | Benn et al. .................. 382/110 |
| 6,104,966 A | | 8/2000 | Haagensen |
| 6,211,789 B1 | * | 4/2001 | Oldham et al. .......... 340/573.3 |
| 6,231,435 B1 | | 5/2001 | Pilger |
| 6,267,661 B1 | | 7/2001 | Melville |
| 6,424,727 B1 | * | 7/2002 | Musgrave et al. .......... 382/117 |
| 6,519,763 B1 | * | 2/2003 | Kaufer et al. ............... 717/101 |

* cited by examiner

US 6,859,672 B2

METHOD OF LINKING A FOOD SOURCE WITH A FOOD PRODUCT

BACKGROUND OF THE INVENTION

The present invention relates to a method of linking source units of food to product items comprising the source units of food.

Food production operations often involve conversion of source units of food into product items. For example in the meat processing industry, animal carcass source units are converted into smaller product items (e.g., meat cuts).

It is desirable to be able to link such product items of food with their original source units in order to track or trace the origin of a product item or the destination of a source unit of food in such conversion processing. This linking may be useful, for example, in providing assurance to consumers or regulators that a product item for sale was actually derived from an animal source unit that was raised or processed under the stated conditions. For example, some consumers desire assurance that "organically grown" beef products were derived from cows that were actually raised by organic methods. Some regulators may want verification or certification that meat product items were derived from animal source units that were raised free from supplemental growth hormones, antibiotics, or biotechnological methods.

The linking of source units of food with the product items of food derived from the source units is also useful to assure food safety and also to assist in product recall, if necessary. The link between a source unit and a product item derived from the source unit provides information helpful in tracing the destination of a suspect source unit of food or the origin of a suspect product item. Such traceability of food is increasingly important in view of harmful pathogens and viruses that have been associated with food product items derived from animal source units. For example, to minimize the effect of an outbreak of food poisoning caused by the presence of e. Coli bacteria in food product items, investigators seek to quickly determine the origin of the source units from which the contaminated food product items were derived in order to effectively conduct product item recall. The same is true for cases of Bovine Spongiform Encephalopathy (BSE) and other contaminations.

It has often proven difficult for producers and investigators to identify the actual source units (i.e., the specific animals or animal carcasses) from which contaminated food product items were derived. This is because the processing operations involved in converting the source units to product items may be complex and large, such as at a modem meat processing operations. Typically, the only detail possible is the identification of the producer of the contaminated food product item (e.g., the company that processed the meat) or the identity of a group of meat-processing facilities from which the contaminated food product item possibly originated.

Complication exists because numerous entities handle the source units of meat cuts at various stages of processing and sales. For example, grazers, growers, slaughterers, fabricators, and distributors each participate in the process of meat production. Growers obtain animals from grazers, and increase the weight of the animals through a feeding process. Slaughterers purchase the animals from growers and convert animals into primary meat products, such as animal carcasses. Fabricators process the carcasses or other larger meat parts into desired portion sizes, package the resulting smaller meat cuts, and forward them to distributors. Distributors usually sell the meat cuts to retail marketers, who in turn sell them to consumers.

The task of linking source units to product items is especially challenging for meat fabricators. When a fabricator cuts animal carcasses into increasingly smaller meat cuts, the cuts may easily mix or mingle; and it is impractical and expensive to tag or label each cut to provide direct linkage of a cut meat product item with its preceding source unit.

As a result of the inability to effectively locate the original source units from which contaminated or suspect food product items were derived, there have been unnecessarily broad recalls and destruction of uncontaminated food product items in an effort to assure the recall of the entire amount of potentially contaminated product items. Further, the lack of effective linking methodology may have precluded the entry of some food products into regulated markets that require assurance of the links between a product item of food and its source unit.

SUMMARY OF THE INVENTION

The present invention addresses one or more of the aforementioned problems. A first aspect is a method of linking source units of food with a product item that includes at least a portion of one or more of the source units of food, where a conversion process produces a plurality of product items from a plurality of source units. A conversion algorithm is created. The conversion algorithm estimates within a desired confidence level a range of the amount of time required by the conversion process to produce a product item from one or more of the source units of food. The time of entry into the conversion process is recorded for each source unit within a desired time period. The time of exit from the conversion process is recorded for each product item within the desired time period. A product item to be linked is selected. A range of an amount of conversion time required to produce the selected product item is estimated by applying the conversion algorithm. The estimated range amount of conversion time for the selected product item is subtracted from the time of exit for the selected product item to generate an estimated time range of entry. Each source unit having a time of entry within the estimated time range of entry is identified.

A second aspect is a method of linking a source unit of food with one or more product items derived from the source unit, where a conversion process produces a plurality of product items from a plurality of source units. A conversion algorithm is created. The conversion algorithm estimates within a desired confidence level a range of the amount of time required by the conversion process to process a source unit of food into one or more product items. The time of entry into the conversion process is recorded for each source unit within a desired time period. The time of exit from the conversion process is recorded for each product item within the desired time period. A source unit to be linked is selected. A range of an amount of conversion time required to process the selected source unit is estimated by applying the conversion algorithm. The estimated range amount of conversion time for processing the selected source unit is added to the time of entry for the selected source unit to generate an estimated time range of exit. Each product item having a time of exit within the estimated time range of exit is identified.

A third aspect is a method of linking a product item to a plurality of product items, where a conversion process produces a plurality of product items from a plurality of source units. A conversion algorithm is created. The conversion algorithm estimates within a desired confidence level a range of the amount of time required by the conversion process to produce a product item from one or more of the source units of food. The time of entry into the conversion process is recorded for each source unit within a desired time period. The time of exit from the conversion process is recorded for each product item within the desired time period. A target product item is selected. A range of an amount of conversion time required to produce the target product item is estimated by applying the conversion algorithm using a first desired confidence level. The estimated range amount of conversion time for the target product item is subtracted from the time of exit for the target product item to generate an estimated time range of entry. Each source unit having a time of entry within the estimated time range of entry is identified. The conversion algorithm using a second desired confidence level is applied to estimate for each identified source unit a range of an amount of process conversion time. The estimated amount of process conversion time for each identified source unit is added to the time of entry for each identified source unit to generate one or more estimated time ranges of exit. Each product item having a time of exit within the one or more estimated time ranges of exit is identified.

A fourth aspect is a method of linking a source unit of food with a product item that includes at least a portion of the source unit of food, where a conversion process produces a plurality of product items from a plurality of source units. A conversion algorithm is created. The conversion algorithm estimates a most likely amount of time required by the conversion process to produce a product item from at least one source unit of food. The time of entry into the conversion process is recorded for each source unit within a desired time period. The time of exit from the conversion process is recorded for each product item within the desired time period. A product item to be linked is selected. A most likely amount of conversion time required to produce the selected product item is estimated by applying the conversion algorithm. The estimated most likely amount of conversion time is subtracted from the time of exit for the selected product item to generate an estimated time of entry. The source unit having a time of entry closest to the estimated time of entry is identified.

A fifth aspect of is a method of linking a source unit of food with one or more product items derived from the source unit, where a conversion process produces a plurality of product items from a plurality of source units. A conversion algorithm is created. The conversion algorithm estimates a most likely amount of time required by the conversion process to process a source unit of food into at least one product item. The time of entry into the conversion process is recorded for each source unit within a desired time period. The time of exit from the conversion process is recorded for each product item within the desired time period. A source unit to be linked is selected. A most likely amount of conversion time required to process the selected source unit is estimated by applying the conversion algorithm. The estimated most likely amount of conversion time is added to the time of entry for the selected source unit to generate an estimated time of exit. Each product item having a time of exit corresponding to the estimated time of exit is identified.

The linking method of the present invention may be used without significantly disrupting the normal conversion process. For example, the linking may occur without the use of specialized tags and related tagging/labeling operation during the conversion process.

These and other objects, advantages, and features of the invention will be more readily understood and appreciated by reference to the detailed description of the invention and the drawings.

DETAILED DESCRIPTION OF THE INVENTION

Figure 2:
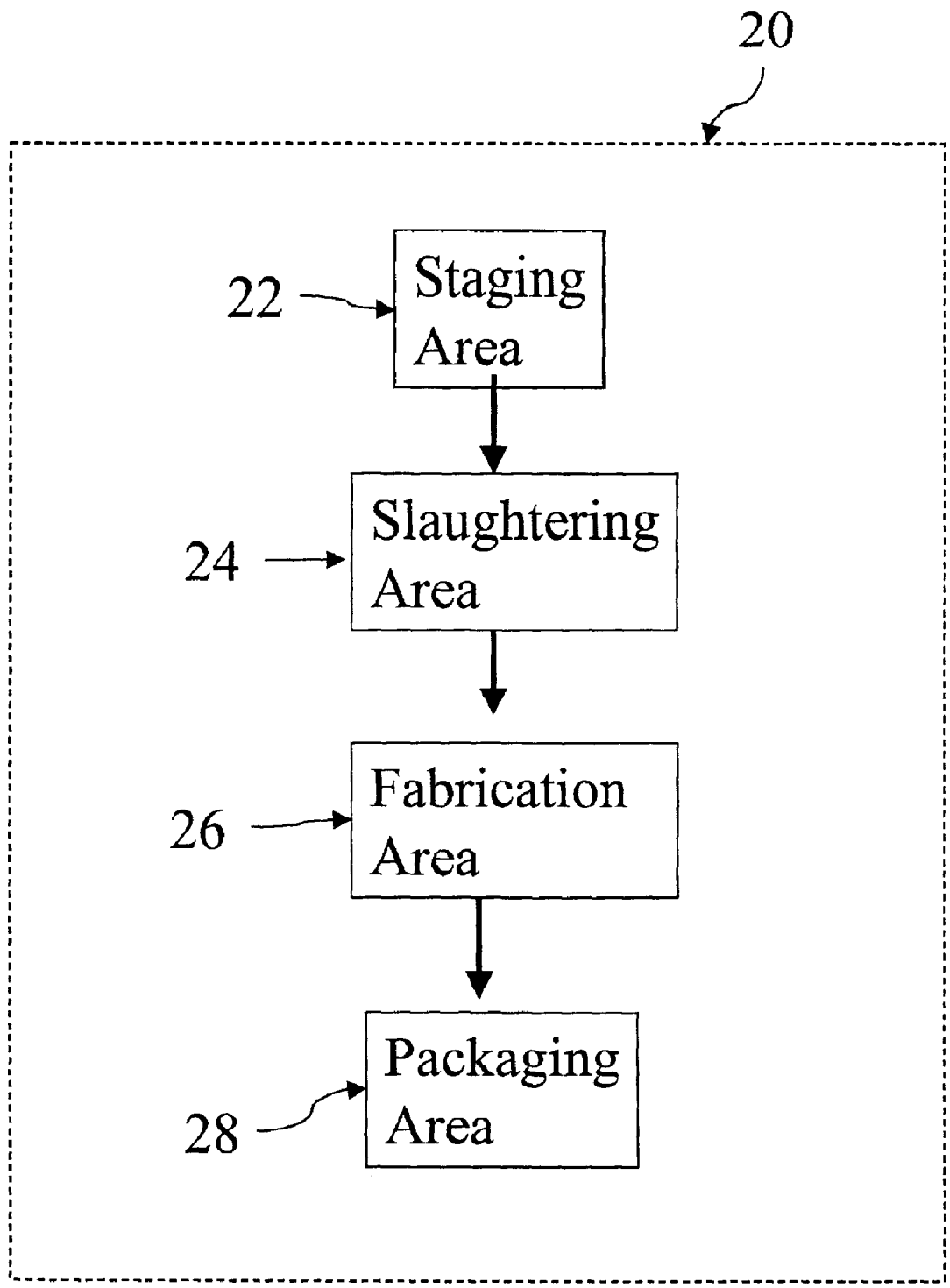
FIG. 2 is a representative schematic of a meat processing facility.
Figure 3:
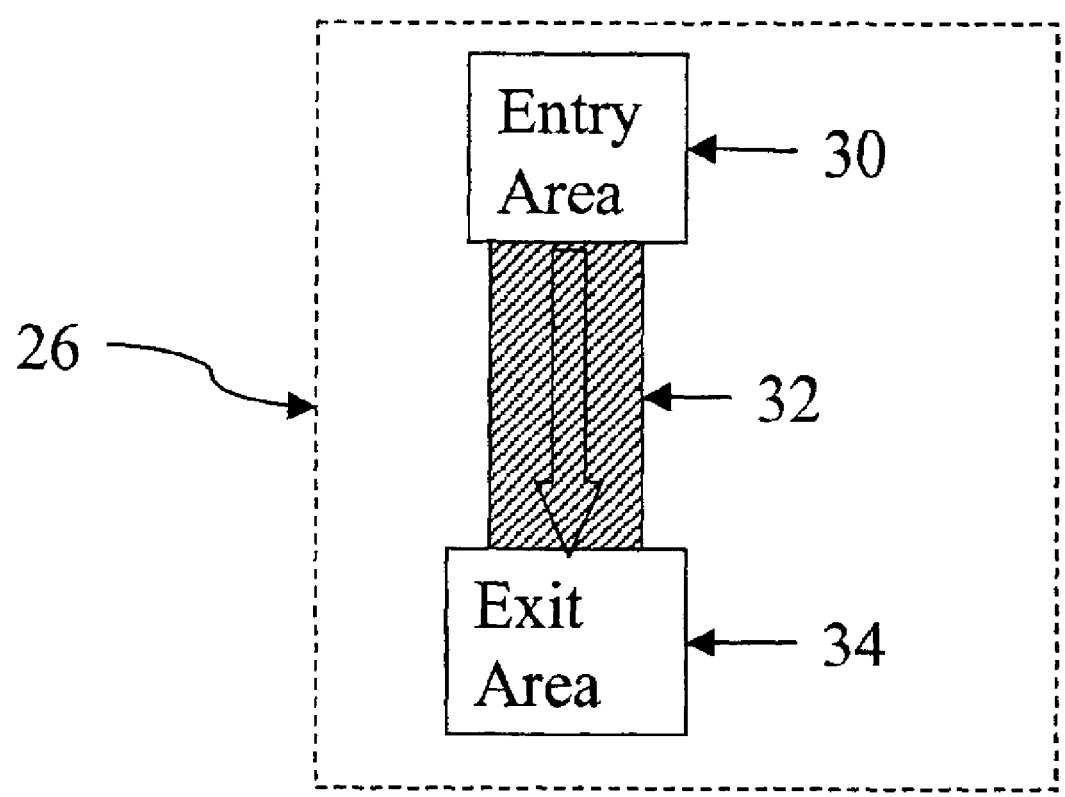
FIG. 3 is representative schematic of the fabrication area of the meat processing facility of FIG. 3.

A conversion process, such as that utilized by a meat processing facility 20, may include a fabrication area 26 having an entry area 30, an exit area 34, and a meat processing line 32 connecting the entry and exit areas. (FIGS. 2–3.) A conversion algorithm may be created to estimate the conversion time expected for producing a product item from a source unit. The conversion algorithm may be used, for example: to link one or more source units to a product item, to link a source unit to one or more product items, or to link a product item to a plurality of product items (e.g., to conduct a product recall).

Conversion Processes

A conversion process may produce a plurality of product items from a plurality of source units of food. Examples of source units of food include live or dead animals (e.g., cattle, sheep, pigs, chicken), plants (e.g., corn), and partially processed objects such as carcasses, primal cuts, section cuts, and grain. Thus, a source unit may be an object derived from an animal (e.g., a primal cut). Examples of conversion processes include meat processing (e.g., cattle or swine fabrication) and meat packing processes, such as those described in U.S. Pat. No. 6,104,966 issued Aug. 15, 2000 entitled "Primal Tracking," which is incorporated herein in its entirety by reference. Examples of product items of food include objects derived from animals, including the fully converted products produced for retail sale, such as ground hamburger, sausage, and retail meat cuts, as well as intermediate objects such as primal cuts and sub-primal cuts.

A source unit of food is upstream from its corresponding product item in a given conversion process. A product item may comprise at least a portion of one or more source units. Further, one or more product items may comprise at least a portion of a source unit.

Depending on the extent of the conversion process under consideration, a source unit of food may be an object other than the earliest starting material for producing a product item—and a product item may be an object other than the ultimate material used by the consumer. For example, if the extent of a given conversion process is defined as turning live cattle into the retail meat cuts derived from the cattle, then the source units of food are the cattle and the product items are the retail meat cuts derived from the cattle. However, if the extent of the conversion process is defined as the butchering of primal cuts of beef into sub-primal cuts of beef, then the primal cuts are the source units of food and the sub-primal cuts are the product items.

Figure 1:
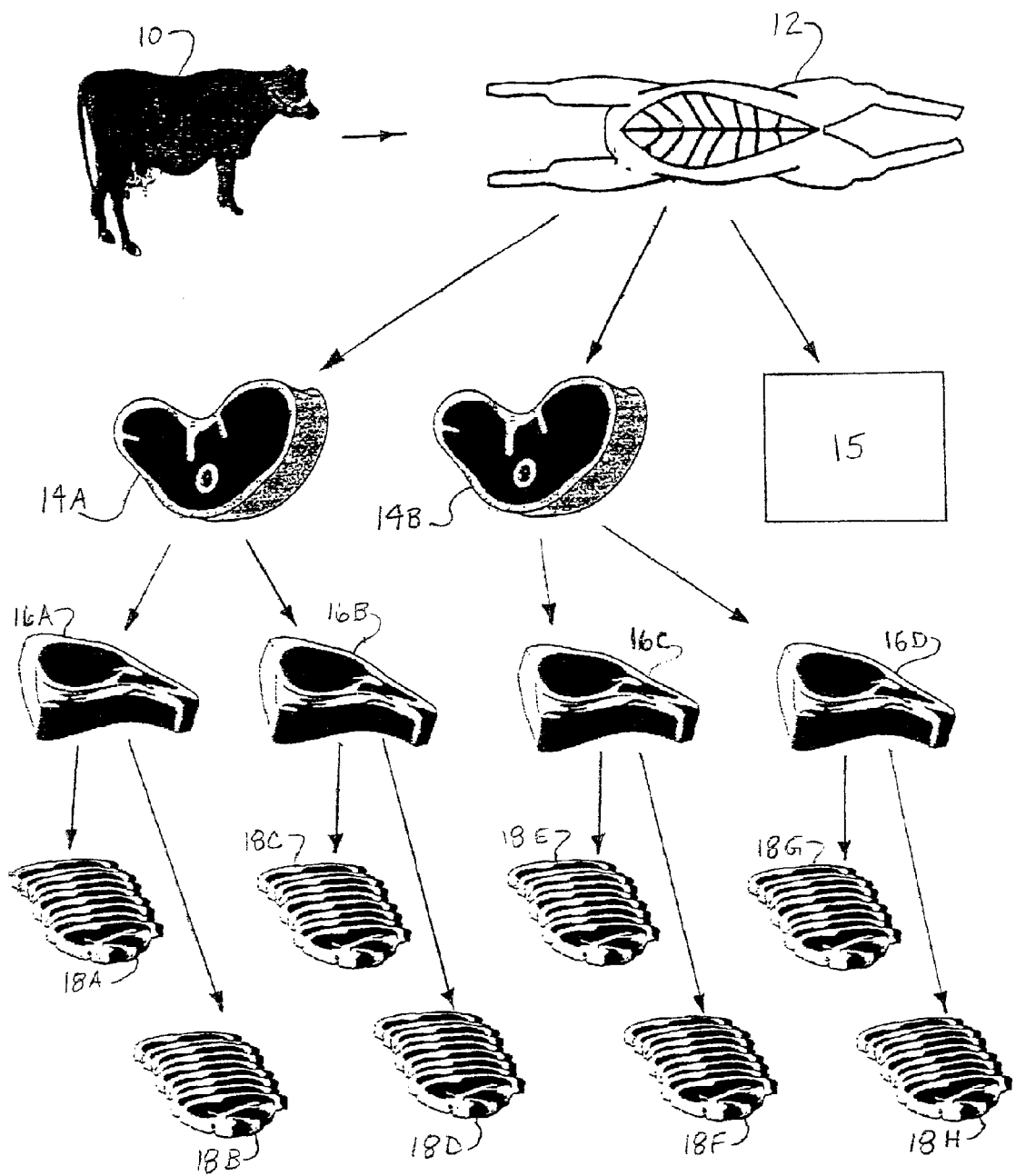
FIG. 1 is a representation of a meat processing conversion process.

In a meat processing conversion process represented by FIG. 1, a cow 10 is slaughtered to render a carcass 12, which is cut to render primal cuts 14a–b and other materials 15

(i.e., the rest of the carcass not comprising the primal cuts). The primal cuts are butchered to render sub-primal cuts 16a–d, which are subsequently processed into retail cuts 18a–h. In this representation, the cow 10 may be considered a source unit of food and the retail cuts 18a–h as product items of food derived from the cow 10 source unit. However, if the conversion process under consideration is more focused, then the intermediate objects 12, 14a–b, and 16a–d may be classified as either as source units or product items depending on the segment of the conversion process being analyzed. For example, if the conversion process is from primal to sub-primal, then primal cuts 14a–b may be classified as source units for the sub-primal cuts 16a–d, which may be considered the product items derived from the primal cut source units. Further, a product item comprising ground hamburger (not shown) may contain a mixture of meat derived from one or more cows as source units.

FIG. 2 shows a schematic of a meat processing facility 20. Cows enter staging area 22. Staging area 22 may be used to read and record information regarding a cow, such as the weight of the cow and the identity of the raiser. Next, the cows enter a slaughter area 24, where the cows are slaughtered and converted into carcasses, which may then be divided into carcass sections (i.e., halves, quarters, or primal cuts). Information regarding a carcass or carcass sections (e.g., the weight, fat content, and yield grade) may be read and recorded at slaughter area 24.

At fabrication area 26, the carcass sections are cut and processed into sub-primal cuts and perhaps retail cuts on the cutting floor. Finally, in packaging area 28, the sub-primal and/or retail cuts are packaged and shipped to customers. If shipped as sub-primal cuts, then the sub-primals may be subsequently unpackaged, cut into retail cuts, and re-packaged at the retail location (not shown) or elsewhere.

Fabrication Area of a Meat Processing Facility

In meat processing, typically the most extensive conversion of the larger source units of meat into numerous smaller meat cuts occurs at fabrication area 26. FIG. 3 schematically illustrates the fabrication area 26 of meat processing facility 20.

By the time a source unit of meat arrives at the fabrication area from the slaughter area, unique identification information may be associated with it. The unique identification information of the source unit may take the form of symbolic, alpha, or numeric information embodied in or on a machine- or human-readable identifier, such as a tag or label (e.g., bar coded tag or label), hole pattern, or radio frequency identification ("RFID") transponder attached to the source unit. The identifier may have been attached to the source unit upstream of staging area 22, or may be attached while the source unit is at the staging or slaughtering areas 22 and 24. RFID tags are useful in that they may facilitate access of previously recorded information regarding the source unit. As an alternative to direct attachment to the source unit, the identifier may be attached to a transportation device associated with the source unit. For example, an identifier may be attached to the trolley used to transport carcass halves on a rail to the fabrication area 26. Further, separate identifiers may be attached to both the source unit and the transportation device.

The source units (e.g., carcasses or carcass sections) enter fabrication area 26 at one or more entry areas 30. The carcasses or carcass sections then travel through meat processing lines 32 while being converted or fabricated. The product items derived from the carcasses or carcass sections then pass to one or more exit areas 34 of the fabrication area 26. Each entry area 30 is linked to an exit area 34 by a production line 32.

Entry Area of the Fabrication Area

The time that each source unit enters a conversion process is recorded for a desired period. Such period may be for the duration of time for which there is a desire to link the source units with the product items derived from the source units in the conversion process.

With respect to the meat processing conversion process, for example, the time that each carcass enters the meat processing line 32 is recorded. An operator or machine may record or scan the unique identification information of the source unit. (If a unique identification information has not already been associated with a source unit by this point, then such information may be associated with or assigned to the source unit at the entry area 30 of the fabrication area 26, using any of the methods previously discussed.) The unique identification information may be uploaded to a computer database so that the computer may associate the identification information with the time of day and date for the entry into the conversion process (e.g., the time of the scanning or uploading of the information according to the internal clock of the computer). The time of entry may be recorded within a desired level of precision, for example, within 15 minutes, 10 minutes, 5 minutes, 1 minute, 30 seconds, 15 seconds, 5 seconds, or 1 second of the actual event.

Additional information about the source unit beyond the time of entry may also be associated with the unique identification information of the source unit, for example by entering (e.g., uploading or scanning) such information to the computer database. With respect to a meat processing conversion process, such additional information may include the raiser's identity, the fat content of the source unit, and the weight of the source unit.

Meat Processing Line of the Fabrication Area

Continuing with the example for a meat processing conversion process, after the time of entry for a source unit (e.g., carcass) is recorded, the source unit enters the meat processing line 32. Meat processing line 32 may include one or more conveyors to transport the meat to and through the cutting floor of the meat processing plant, where the meat is further subdivided and trimmed during conversion processing. Typically, a carcass is sectioned so that different conveyors carry the sectioned portions through the meat processing line. Eventually, product items (e.g., sectioned meat cuts) derived from the source unit pass to the exit area 34 of the fabrication area 26.

Exit Area of the Fabrication Area

The time that each product item exits the conversion process is recorded for the desired period previously discussed. With respect to the meat processing conversion process, for example, the time that each sectioned meat cut product item exits the meat processing line 32 is recorded. The time of exit may be recorded on a label or packaging associated with the product item.

A unique identification information for each product item may be associated with or assigned to the product item at the exit area 34 of the fabrication area 26 (if such information was not previously assigned in the meat processing line 32), using any of the methods previously discussed with respect to the unique identification information of the source unit (including the embodiment of the unique identification information in or on a machine- or human-readable identifier). An operator or machine may record or scan the unique identification information of the product item. The unique identification information of the product item may be uploaded to a computer database so that the computer may associate the identification information with the time of day and date for the exit from the conversion process (e.g., the time of the scanning or uploading of the information according to the internal clock of the computer). The time of exit may be recorded within a desired level of precision, for example, within 15 minutes, 10 minutes, 5 minutes, 1 minute, 30 seconds, 15 seconds, 5 seconds, or 1 second of the actual event. The unique identification information may be sent to a computer database at the time it is created for association with the product item.

Additional information about the product item beyond the time of exit may also be associated with the unique identification information of the product item, for example by entering (e.g., uploading or scanning) such information to the computer database. With respect to a meat processing conversion process, such additional information may include, for example, the identity of the meat processing line or the conveyor, the weight of the product item, and the meat type of the product item (e.g., tenderloin). The additional information (or a portion of it) may also be embodied in or on the machine- or human-readable identifier.

The unique identification information of the product item may be created at or near the time it is needed for association with the product item. Alternatively, the unique identification information may be created before the time it is needed for association with the product item—that is, created before the product item is produced. As an example of the latter concept, labels or packaging bags for a meat cut product items may be pre-formed with machine-readable bar codes encoding a unique serial number on each label or bag. The unique identification information for each product item may then be associated with the product item when the product item is labeled or packaged, for example, at packaging area 28.

Conversion Algorithm

A conversion algorithm may be created to estimate within a desired confidence level a range of the amount of time required by the conversion process to produce a product item from one or more source units or to process a source unit into one or more product items. The conversion algorithm may also be created to estimate the most likely amount of time required by the conversion process either to produce a product item from at least one source unit of food or to process a source unit of food into at least one product item.

The conversion algorithm may be an equation or a set of rules. The conversion algorithm may include a set of calculations and/or other pre-defined series of logic operations, and may act on the variables of the time of entry into and the time of exit from the conversion process. The conversion algorithm may be empirical, based on data obtained from actual observations and tests of the conversion process. It is helpful that such actual observations and tests occur during representative (e.g., minimally disturbed) operation of the conversion process. The conversion algorithm may be stored in a computer for access and use by the processing unit of the computer.

To obtain the data useful for creating the conversion algorithm, one or more source units may be specifically tracked during the conversion process that converts the one or more source units into product items. By specifically tracking source units, they may be definitively linked to the one or more product items derived from the specifically tracked source units—and conversely, the one or more product items containing at least a portion of the specifically tracked source units may be definitively linked to the source units. Further in conjunction with the tracking, at least two times may be recorded—the time of entry into the conversion process for the specifically tracked source unit and the time of exit from the conversion process for the one or more product items derived from the specifically tracked source unit. The differences between the corresponding time of entry and times of exit represents the amount of conversion time required for the specifically tracked source unit.

Examples of ways to specifically track the conversion of a source unit into one or more product items include DNA identification of source units and product items, continuous or selected video monitoring of the conversion process, tagging or marking (e.g., color marking) of the intermediate objects derived during the conversion process from the specifically tracked source unit, and tagging of the transportation devices (e.g., trays, totes and conveyor belts) associated with the intermediate objects derived from the specifically tracked source unit.

For example, if DNA testing is used, then a DNA profile of the source units may be determined using methods known to those of skill in the art. The DNA profiles may also be determined for a selected group of product items that is sufficiently large so that it is reasonably expected to contain the one or more product items derived from the specifically tracked source units. The DNA profiles of the source units and product items are compared to determine which products items were derived from each specifically tracked source unit.

If color markings are used, then the specifically tracked source unit (e.g., carcass) may be marked with a paint mark of selected specific color. Each intermediate object derived from the source unit (e.g., each cut of meat) derived from the source unit may also be marked with selected paint color—so that the product item derived from the source unit may also be marked with the selected paint color to specifically link it to the painted source unit.

By statistically analyzing the conversion times for a number of specifically tracked source units, one may generate an expected range within a given confidence level for the amount of time—or alternatively, the most likely amount of time—required by the conversion process to produce a product item from a source unit. It is helpful that the number of specifically tracked units be sufficiently large such that the desired confidence level for the resulting conversion algorithm may be achieved. The statistical methods required for such analysis are well-know to one of skill in the art.

The conversion algorithm may be specific to a particular area of the conversion process or type of product item. For example, the conversion algorithm may be generated for a particular meat cut product item (e.g., ribeye, tenderloin) produced on a particular fabrication area or meat processing line. It is expected that differing product items and processing lines may have or require differing conversion times. Yet, predictable events regularly take place in the course of a conversion process.

For example, in a typical meat processing facility, the distances between different operational locations and the times allotted to various processing steps of the conversion process may remain fairly constant or fluctuate in a predictable manner. Thus, the total time necessary to convert a given source unit into one or more product items may also remain fairly constant. As a result, the time difference between the time of appearance of the source unit at an pre-determined point in the conversion process and the time of appearance of product items produced from the source unit may be a property of a given processing facility, reflecting characteristics such as the speed of the conveyor, the distances between various processing stations, the times allotted to certain processing operations, and the skill of the operator. The actual conversion times may reflect a range of variance due to, for example, the variations in the size of the source unit animals, the natural fluctuations in process conditions, and process interruptions. Thus, the conversion algorithm may account for these range of variances.

Further, the conversion algorithm may account for additional event information, such as the time at which a break in the conversion process occurs. The patterns of time of entry or time of exit data may be monitored, for example, by computer. An unusually large difference between one source unit's time of entry and the subsequent source unit's time of entry—or one product item's time of exit and the subsequent product item's time of exit—may indicate a process stoppage. The conversion algorithm may account for this stoppage by increasing the conversion time for the affected source units in the conversion process during the stoppage.

Also, the conversion algorithm may be formulated to use variations in the characteristics of the source units and/or product items in estimating the expected range of conversion time or most likely amount of conversion time. For example, the conversion algorithm may take into account the weight or size of a source unit (e.g., meat carcass), based on the empirical information that a larger source unit may take an observed longer time to convert than a smaller source unit.

Desired Confidence Level

The conversion algorithm may be used to estimate the amount of conversion time within a desired confidence level. In so doing, the conversion algorithm may incorporate well-known statistical, probability, or other mathematical methods. The term "confidence level" as used herein refers to the percentage probability that an actual amount of conversion time will fall within the range of amount of conversion time estimated by the conversion algorithm to be required by the conversion process, assuming a Gaussian distribution for the conversion times for a given conversion process.

For example, the mean and standard deviation of the conversion times for the specifically tracked source units may be calculated. The minimum conversion time (" $t_{min}$ ") and the maximum conversion time (" $t_{max}$ ") for the range of expected conversion time may then be calculated as follows:

$$t_{min} = \text{mean} - x(\text{standard deviation})$$

and $$t_{min} = \text{mean} + x(\text{standard deviation}).$$

If "x" is selected to be 1.96, for example, then the confidence level is 95%, as is known to those of skill in the art. Other values of "x" yield other corresponding confidence levels, as is also known to those of skill in the art.

If it is desired with a high level of confidence that the amount of conversion time required to produce a selected product item actually falls within the range of conversion time estimated by the conversion algorithm, then the conversion algorithm may use one set of instructions and/or parameters to generate a relatively wider range of conversion time. Conversely, if a lower level of confidence is desirable or acceptable, then the conversion algorithm may use a different set of instructions and/or parameters to estimate a relatively narrow range of conversion time. Thus, for example, if the linking method is used in conjunction with a product recall (as discussed below) for safety reasons, then a high level of confidence is desired so that the conversion algorithm may predict a relatively large range of conversion time—which ultimately results in a relatively larger number of objects identified for recall. However, a lower level of confidence may be acceptable for quality assurance in order to assure a greater likelihood that a given product item was actually derived from a given source unit.

The desired confidence level may be less than any of the following values: 100%, 99%, 95%, 90%, 80%, 70%, and 60%; may be at least any of the following values: 40%, 50%, 60%, 70%, 80%, and 90%; and may range between any two of the foregoing values.

Linking Product Items and Source Units

The present invention may be used in several ways, for example: 1) to link one or more source units to a product, 2) to link one or more product items to a source unit, 3) to link a plurality of product items to a product item, for example to effect a product recall, 4) to identify a most likely source unit from which a selected product item was derived, and 5) to identify a most likely product item derived from a selected source unit.

Linking One or More Source Units to a Product Item

In order to link one or more source units to a product item that includes at least a portion of the one or more source units, first a product item to be linked is selected. The time of exit from the conversion process is obtained for the selected product item. This may be done, for example, by visual or machine reading of information on an associated printed label or otherwise associated with the product item. It may also be done by visual or machine reading of the unique identification information for the selected product item, followed by looking up the time of exit for the product item that is associated with the unique identification information in the computer database.

A range of the amount of conversion time may then be estimated by applying the conversion algorithm at the desired confidence level to the time of exit. This may be done by the processing unit of a computer. The range of conversion time is then subtracted from the time of exit to generate an estimated time range of entry for the one or more source units from which the product item was potentially derived.

The unique identification information for each source unit having a time of entry within the estimated time range of entry may then be identified, for example, by lookup in the computer database. As a result, the selected product item is linked with the identified source units, from which the selected product item may have been derived. The number of identified source units may be a plurality and may be at least any of the following values: 2, 5, 10, 15, 20, 50, and 100.

Linking One or More Product Items to a Source Unit

In order to link a source unit to one or more product items produced to include at least a portion of the source unit, first a source unit to be linked is selected. The time of entry to the conversion process is obtained for the selected source unit. This may be done, for example, by looking up in a computer database the time of entry for the source unit that is associated with the unique identification information for the source unit.

A range of the amount of conversion time may then be estimated by applying the conversion algorithm at the desired confidence level to the time of entry. Again, this may be done by the processing unit of a computer. The range of conversion time is then added to the time of entry to generate an estimated time range of exit for the one or more product items potentially derived from the source unit.

The unique identification information for each product item having a time of exit within the estimated time range of exit may then be identified, for example, by lookup in the computer database. As a result, the selected source unit is linked with the identified product items, which may have been derived from the selected source unit. The number of identified product items may be a plurality and may be at least any of the following values: 2, 5, 10, 15, 20, 50, and 100.

Linking a Product Item to Plurality of Product Items

A product item may be linked to a plurality of product items. This may be useful, for example, in conducting a product recall as a result of having identified a contaminated product item. First, one or more source units may be linked to the selected product item (i.e., target product item) using the method discussed above. This may result in the identification of the unique identification information for each source unit linked with the selected product item. Next, each of these source units is linked with the one or more product items produced to include at least a portion of the source unit, using the method discussed in the preceding section. This may result in the identification of the unique identification information for the product items linked with each of the source units. The conversion algorithm used in estimating the conversion time may use the same desired confidence level in each of the linking steps above, or may use different desired confidence levels for the linking steps.

As a result of this process, the identified product items are linked to the target product item originally selected. Thus, this identified set of product items includes one or more product items derived from a source unit from which the target product item was also derived. If this method is used in conducting a product recall, then the identified product items may be recalled or otherwise collected.

Identifying the Most Likely Source Unit or Product Item

A selected product item may be linked to the most likely source unit from which the selected product item was derived. The conversion algorithm is applied to estimate the most likely amount of time required by the conversion process to produce a product item from at least one source unit of food. This estimated most likely amount of conversion time is subtracted from the time of exit for the selected product item to generate an estimated time of entry. The source unit having a time of entry closest to the estimated time of entry may be considered the most likely source unit from which the selected product item was derived.

Similarly, a selected source unit of food may be linked to the most likely product items derived from the selected source unit. The conversion algorithm is applied to estimate the most likely amount of time required to process the selected source unit. This estimated most likely amount of conversion time is added to the time of entry for the selected source unit to generate an estimated time of exit. The one or more product items having a time of exit corresponding to the estimated time of exit may be considered the most likely product items derived from the selected source unit.

The methods and equipment of computers, computer databases, computer processing units, information loading methods, and software programs mentioned or implied above in conjunction with the present invention are well-known to those of skill in the art and therefore are not discussed in detail here.

Although the present invention has been discussed in conjunction with a meat processing facility example, it is to be understood that the invention is not limited to the example of a meat processing conversion process example.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, use conditions, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated.

What is claimed is:

1. A method of linking source units of food with a product item that includes at least a portion of one or more of the source units of food, where a conversion process produces a plurality of product items from a plurality of source units, the method comprising:

creating a conversion algorithm that estimates within a desired confidence level a range of the amount of time required by the conversion process to produce a product item from one or more of the source units of food;

recording the time of entry into the conversion process for each source unit within a desired time period;

recording the time of exit from the conversion process for each product item within the desired time period;

selecting a product item to be linked, wherein the selected product item has a given time of exit from the conversion process;

estimating a range of an amount of conversion time required to produce the selected product item by applying the conversion algorithm;

subtracting the estimated range amount of conversion time for the selected product item from the time of exit for the selected product item to generate an estimated time range of entry; and identifying each source unit having a time of entry within the estimated time range of entry.

2. The method of claim 1 wherein at least two source units having a time of entry within the estimated time range of entry are identified.

3. The method of claim 1 wherein the conversion algorithm comprises an equation.

4. The method of claim 1 wherein the conversion algorithm comprises a set of rules.

5. The method of claim 1 wherein the conversion algorithm is created by utilizing empirical data.

6. The method of claim 1 wherein the creation of the conversion algorithm utilizes empirical data derived from DNA tracing.

7. The method of claim 1 wherein the creation of the conversion algorithm utilizes empirical data derived from video monitoring selected objects produced during the conversion process.

8. The method of claim 1 wherein the creation of the conversion algorithm utilizes empirical data derived from marking or tagging selected objects produced during the conversion process.

9. The method of claim 1 wherein each source unit is selected from animals and objects derived from animals.

10. The method of claim 1 wherein each source unit is selected from cows, sheep, pigs, and objects derived therefrom.

11. The method of claim 1 wherein desired confidence level is less than 100%.

12. The method of claim 1 wherein the desired confidence level ranges from about 50% to about 99%.

13. The method of claim 1 wherein the conversion process comprises a meat processing process.

14. The method of claim 1 wherein:
the times of entry and exit are recorded in a computer; and
the computer uses the conversion algorithm to estimate the range of the amount of conversion time required to produce the selected product item.

15. The method of claim 1 wherein a computer applies the algorithm to estimate the range of an amount of conversion time.

16. The method of claim 1 further comprising recording a characteristic of the source unit in addition to the time of entry.

17. The method of claim 1 wherein the recorded time of entry of each source unit comprises the date, hour, and minute of entry.

18. The method of claim 1 wherein the conversion algorithm accounts for the weight attribute of a source unit.

19. The method of claim 1 further comprising:
associating each of the source units within the desired time period with a unique source unit identifier;
associating each of the product items within the desired time period with a unique product item identifier;
linking in a computer database the time of entry into the conversion process of each source unit with its corresponding source unit identifier; and
linking in a computer database the time of exit from the conversion process of each product item with its corresponding product item identifier.

20. The method of claim 1 further comprising:
associating each of the product items within the desired time period with a unique product item identifier;
linking in a computer database the time of exit from the conversion process of each product item with its corresponding product item identifier; and
packaging each of the product items in a package, wherein the package has been marked with the unique product item identifier before the product item was produced.

21. A method of linking a source unit of food with one or more product items derived from the source unit, where a conversion process produces a plurality of product items from a plurality of source units, the method comprising:
creating a conversion algorithm that estimates within a desired confidence level a range of the amount of time required by the conversion process to process a source unit of food into one or more product items;
recording the time of entry into the conversion process for each source unit within a desired time period;
recording the time of exit from the conversion process for each product item within the desired time period;
selecting a source unit to be linked, wherein the source unit has a given time of entry into the conversion process;
estimating a range of an amount of conversion time required to process the selected source unit by applying the conversion algorithm;
adding the estimated range amount of conversion time for processing the selected source unit to the time of entry for the selected source unit to generate an estimated time range of exit; and
identifying each product item having a time of exit within the estimated time range of exit.

22. The method of claim 21 wherein at least two product items having a time of exit within the estimated time range of exit are identified.

23. The method of claim 21 wherein the conversion algorithm comprises an equation.

24. The method of claim 21 wherein the conversion algorithm comprises a set of rules.

25. The method of claim 21 wherein the conversion algorithm is created by utilizing empirical data.

26. The method of claim 21 wherein the creation of the conversion algorithm utilizes empirical data derived from DNA tracing.

27. The method of claim 21 wherein the creation of the conversion algorithm utilizes empirical data derived from video monitoring selected objects produced during the conversion process.

28. The method of claim 21 wherein the creation of the conversion algorithm utilizes empirical data derived from marking or tagging selected objects produced during the conversion process.

29. The method of claim 21 wherein each product item comprises an object derived from an animal.

30. The method of claim 21 wherein each product item comprises an object derived from an animal selected from cows, sheep, and pigs.

31. The method of claim 21 wherein desired confidence level is less than 100%.

32. The method of claim 21 wherein the desired confidence level ranges from about 50% to about 99%.

33. The method of claim 21 wherein the conversion process comprises a meat processing process.

34. The method of claim 21 wherein:
the times of entry and exit are recorded in a computer; and
the computer uses the conversion algorithm to estimate the range of the amount of conversion time required to process the selected source unit.

35. The method of claim 21 wherein a computer applies the algorithm to estimate the range of an amount of conversion time.

36. The method of claim 21 further comprising recording a characteristic of the product item in addition to the time of exit.

37. The method of claim 21 wherein the recorded time of exit of each product item comprises the date, hour, and minute of exit.

38. The method of claim 21 wherein the conversion algorithm accounts for variations in the characteristics of the product item.

39. The method of claim 21 further comprising:
associating each of the source units within the desired time period with a unique source unit identifier;
associating each of the product items within the desired time period with a unique product item identifier;
linking in a computer database the time of entry into the conversion process of each source unit with its corresponding source unit identifier; and
linking in a computer database the time of exit from the conversion process of each product item with its corresponding product item identifier.

40. The method of claim 21 further comprising:
associating each of the product items within the desired time period with a unique product item identifier;
linking in a computer database the time of exit from the conversion process of each product item with its corresponding product item identifier; and
packaging each of the product items in a package, wherein the package has been marked with the unique product item identifier before the product item was produced.

41. A method of linking a product item to a plurality of product items, where a conversion process produces a plurality of product items from a plurality of source units, the method comprising:
creating a conversion algorithm that estimates within a desired confidence level a range of the amount of time required by the conversion process to produce a product item from one or more of the source units of food;
recording the time of entry into the conversion process for each source unit within a desired time period;
recording the time of exit from the conversion process for each product item within the desired time period;
selecting a target product item, wherein the target product item has a given time of exit from the conversion process;
estimating a range of an amount of conversion time required to produce the target product item by applying the conversion algorithm using a first desired confidence level;
subtracting the estimated range amount of conversion time for the target product item from the time of exit for the target product item to generate an estimated time range of entry;
identifying each source unit having a time of entry within the estimated time range of entry;
applying the conversion algorithm using a second desired confidence level to estimate for each identified source unit a range of an amount of process conversion time;
adding the estimated amount of process conversion time for each identified source unit to the time of entry for each identified source unit to generate one or more estimated time ranges of exit; and
identifying each product item having a time of exit within the one or more estimated time ranges of exit.

42. The method of claim 41 wherein the first and second desired confidence levels are the same.

43. The method of claim 41 wherein the first and second desired confidence levels are different.

44. A method of recall comprising recalling each product item identified by the method of claim 41.

45. A method of linking a source unit of food with a product item that includes at least a portion of the source unit of food, where a conversion process produces a plurality of product items from a plurality of source units, the method comprising:
creating a conversion algorithm that estimates a most likely amount of time required by the conversion process to produce a product item from at least one source unit of food;
recording the time of entry into the conversion process for each source unit within a desired time period;
recording the time of exit from the conversion process for each product item within the desired time period;
selecting a product item to be linked, wherein the selected product item has a given time of exit from the conversion process;
estimating a most likely amount of conversion time required to produce the selected product item by applying the conversion algorithm;
subtracting the estimated most likely amount of conversion time from the time of exit for the selected product item to generate an estimated time of entry; and
identifying the source unit having a time of entry closest to the estimated time of entry.

46. A method of linking a source unit of food with one or more product items derived from the source unit, where a conversion process produces a plurality of product items from a plurality of source units, the method comprising:
creating a conversion algorithm that estimates a most likely amount of time required by the conversion process to process a source unit of food into at least one product item;
recording the time of entry into the conversion process for each source unit within a desired time period;
recording the time of exit from the conversion process for each product item within the desired time period;
selecting a source unit to be linked, wherein the source unit has a given time of entry into the conversion process;
estimating a most likely amount of conversion time required to process the selected source unit by applying the conversion algorithm;
adding the estimated most likely amount of conversion time to the time of entry for the selected source unit to generate an estimated time of exit; and
identifying each product item having a time of exit corresponding to the estimated time of exit.

* * * * *